Patented July 22, 1941

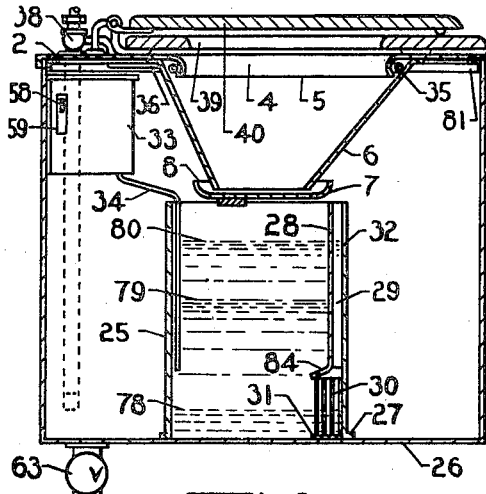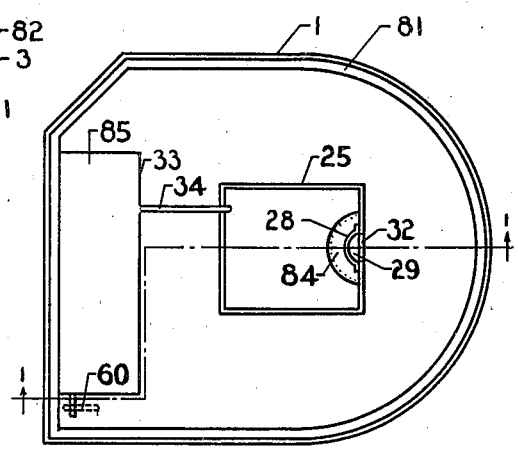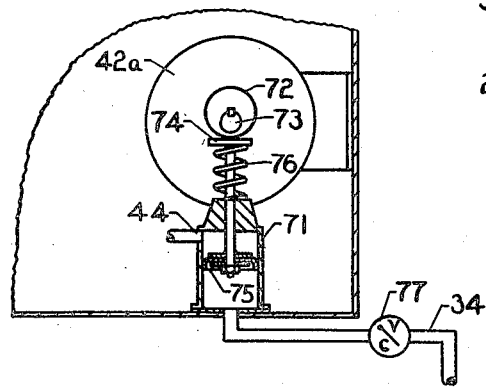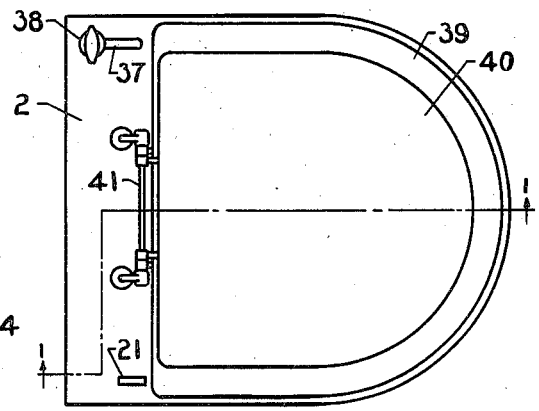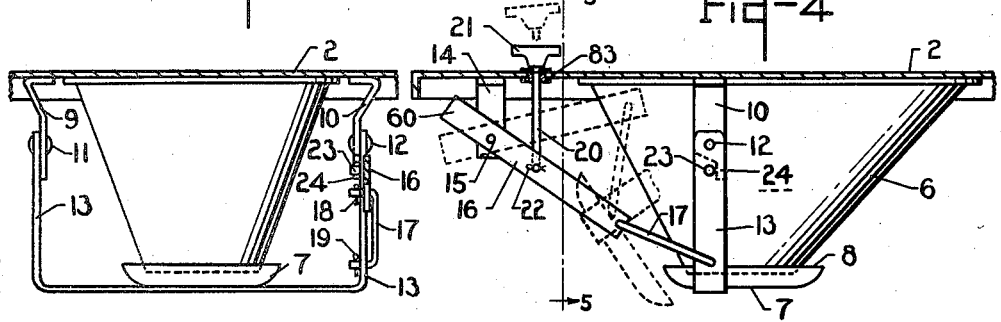

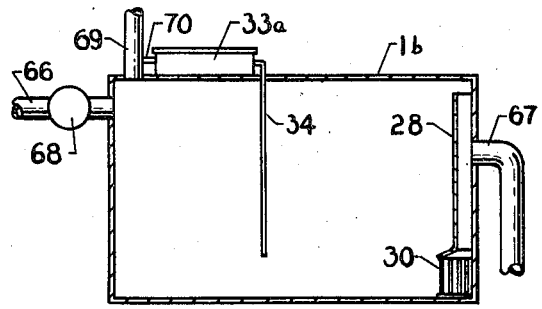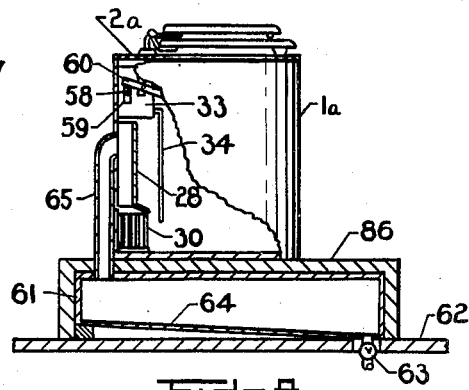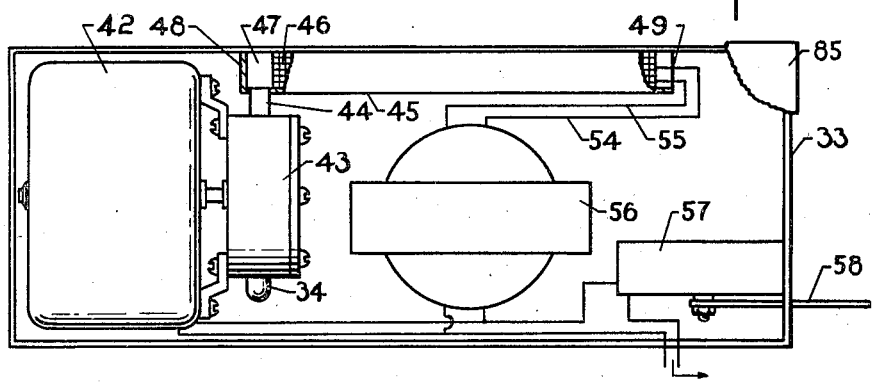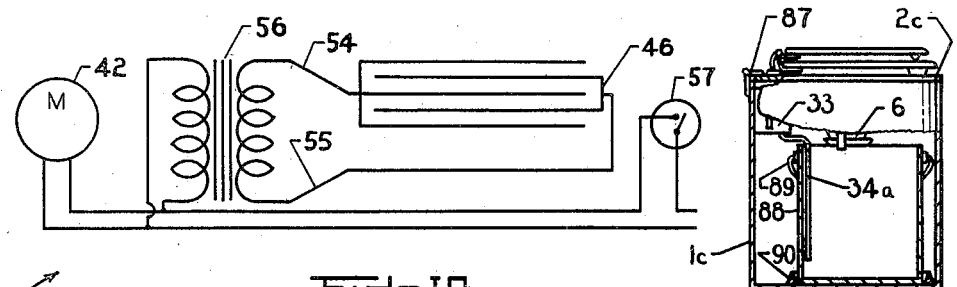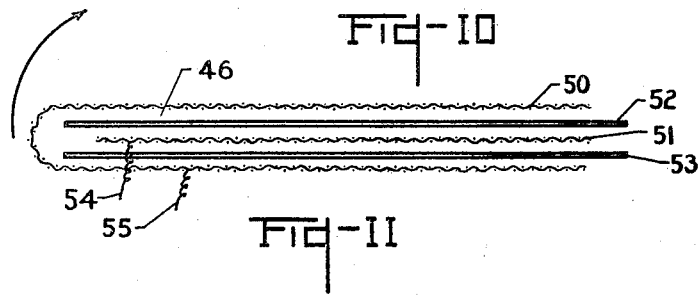

2,249,739

UNITED STATES PATENT OFFICE 2,249,739

METHOD AND APPARATUS FOR TREATING SEWAGE

George T. Brownell and Walter J. Woodhams, Marshall, Mich.

Application January 19, 1940, Serial No. 314,673

15 Claims. (Cl. 4—115)

The present invention relates broadly to methods and apparatus for treating materials, and in its specific phases, it relates to a method and apparatus for ozone treating of sewage containing a high percentage of secretions and excretions of the human body.

We are aware that ozone has been used to a slight extent to purify water and to increase the oxygen content in sewage effluent from which sewage solids had been substantially removed. Our present invention does not deal with this water and effluent treatment with ozone, but rather is largely predicated upon our discovery that sewage of lower water content than is found in ordinary sewage found in city sewers, and which contains a large percentage of solids and semi-solids largely in the form of colloids and colloidal matter, such as are present in the secretions and excretions of the human body, i. e. fecal matter, may be advantageously treated in relatively concentrated form in water by means of ozone. This treatment, we have found, is effective in satisfying the biochemical oxygen demand of the sewage, sterilizes and deodorizes same, and at the same time in some manner causes practically all of the solid or semi-solid constituents of the sewage to become fluidified, dispersed, or suspended so as to facilitate the handling and removal of same under free-flowing conditions.

House trailer toilets of the types now in common use universally consist of a housing with a suitable seat and an excrement receiving receptacle below the seat. Deodorant chemicals, which almost universally are of the type containing chlorine, are used in the receptacle in an attempt to reduce the characteristic bad odors. These chemicals, however, merely act upon the deposited excrement and have little effect upon the odors in the air space of the toilet or toilet room, and moreover, the constant odor of the deodorant chemicals is far from pleasant or desirable. The present invention was devised to overcome these difficulties and shortcomings of the prior procedures and apparatus.

Accordingly, among the objects of the present invention is the provision of a method and apparatus for the treatment and deodorization of sewage and the like.

Another object is to provide a method and apparatus for ozone treatment of aqueous sewage having a high content of solids and semi-solids of the excrement type.

Another object is the provision of a procedure as well as apparatus for treating aqueous sewage having a high content of excrement solids and semi-solids so as to convert same to substantially free-flowing condition.

A further object is to provide a method and apparatus wherein aqueous sewage having a high content of solids and semi-solids of the excrement type is treated by bubbling ozone therethrough in a treating compartment, and a portion of the treated sewage withdrawn from the treating compartment substantially in step with the addition of fresh sewage thereinto, the withdrawn sewage being further treated by means of ozone carried thereby and/or in contact with the upper surface of same.

A further object is to treat either domestic sewage or industrial waste containing colloids, colloidal matter, and putrescible matter in general to partially or wholly satisfy the biochemical oxygen demand of the sewage and prepare same for further treatment or disposal.

A further object is to provide an apparatus wherein ozone is automatically generated and the sewage treated therewith as required.

A still further object is to provide a sewage treatment apparatus which is of simplified construction, compact, may be made portable for house trailer use, and is highly satisfactory.

Further objects and advantages of the invention will appear as the description proceeds.

To the accomplishment of the foregoing and related ends, the invention, then, consists of the methods and means hereinafter fully described and particularly pointed out in the claims, the annexed drawings and the following description setting forth in detail certain means and modes of carrying out the invention, such disclosed means and modes illustrating, however, but several of various ways in which the principle of the invention may be used.

In said annexed drawings:

Figure 1 shows a sectioned assembly view of one form of the present invention as taken substantially on the lines I—I of Figures 2 and 4.

Figure 2 is a top view of the assembly of Figure 1 with the seat carrying upper portion of the assembly removed.

Figure 3 shows one form of ozone pumping apparatus.

Figure 4 shows a top view of the seat carrying upper portion of the assembly shown in Figure 1.

Figure 5 is a partially sectioned assembly view taken along the line 5—5 of Figure 6.

Figure 6 is a partial assembly side view of the seat carrying portion of the apparatus shown in Figure 1.

Figure 7 shows a modified form of the present apparatus particularly adapted for household use where sewer facilities are not available.

Figure 8 shows a partially sectioned assembly view of a modified form of the apparatus shown in Figure 1.

Figure 9 is a top view of the ozone producing and pumping assembly.

Figure 10 shows a typical wiring diagram for the assembly shown in Figure 9.

Figure 11 shows an enlarged end view of a simple form of ozone generator with the parts thereof spread apart for ease of understanding.

Figure 12 shows a partially sectioned assembly view of a modified form of the present invention.

Referring to Figure 1 of the drawings, the apparatus shown utilizes a housing 1 having an upper closure panel 2 with a flanged edge 3. Inturned flange 81 around the top of housing 1 is preferably coated on its upper face with a plastic sealing compound 82 prior to final assembly of the apparatus so that an air-tight joint is made with upper closure panel 2. The upper closure panel 2 is provided with an opening 4 circumscribed by downturned flange 5. Depending from upper closure panel 2 is a bowl member 6, the upper edge of which is fastened and sealed to panel 2 so as to circumscribe opening 4 and clear the lower edge of downturned edge 5. The bowl member 6 is open at both top and bottom. The lower end of this bowl member, however, extends into a tray 7 which has an upturned edge 8 such that when the tray is filled with water, it will seal the lower end of bowl 6, thus making the interior of the assembly air tight and odor leakage proof. Fastened to the under face of upper closure panel 2 are supporting members 9 and 10 (Figure 5). Pivotally joined to these supporting members by means of rivets 11 and 12, respectively, is a saddle member 13 on the upper face of which is mounted tray 7. To provide clearance for the tray 7 relative to the lower end of bowl member 6 when the tray is swung with saddle 13 about pivots 11 and 12, the supporting members 9 and 10 with saddle 13 are preferably located near the edge of tray 7 which corresponds with the direction of pivotal movement of the tray. As shown in Figure 6, this construction not only facilitates clearing the lower end of bowl member 6 when tray 7 is swung to the left, but it also facilitates readily dumping the contents of the tray under conditions of such motion. The position of the tray when retracted, together with a portion of the associated parts, is shown in dotted lines.

A supporting bracket 14 (Figure 6) is mounted on the under face of upper cover panel 2 and is connected by means of pivot member 15 to lever 16, one end of which is pivotally connected by means of link 17 to saddle member 13. Link member 17 may be of various forms of construction, but one convenient form for use consists of a rod bent into U shape and fastened in place by means of cotter pins 18 and 19 as shown in Figure 5. Intermediate between pivot 15 and the point where lever 16 is pivotally connected to link 17 is pivotally mounted a pull rod 20 with handle 21. Upper panel 2 at the point where pull rod 20 passes therethrough is preferably provided with a rubber bushing 83 which forms a substantially air-tight slip fit with rod 20. A cotter pin 22 or the equivalent may be used for fastening the lower end of rod 20 to lever 16. By pulling up on handle 21, tray 7 may be readily moved to its dotted position as shown in Figure 6. In order to centralize tray 7 under the lower outlet of bowl member 6 and take advantage of the locking toggle action of lever 16 and link 17, saddle member 13 is provided with a stop pin 23, and supporting member 10 is provided with an abutment end 24 adapted to cooperate with stop pin 23 so as to hold tray 7 in proper position at the end of its return movement after emptying. By connecting lever 16 and link 17 so that their point of pivotal connection drops below a line joining the pivotal points at the opposite ends of said lever and link as shown in solid lines in Figure 6, tray 7 is locked in place so that same cannot be swung on saddle 13 about pivots 11 and 12 due to accidental pressure exerted through the interior of bowl 6. By making the pivotal connection of link 17 to lever 16 a loose fit, the toggle action is facilitated to permit movement past dead center for locking purposes.

The housing 1 (Figure 1) is provided with a treatment chamber 25 which is open at its top and sealed in fluid-tight manner to the bottom panel 26 of housing 1. The use of a flange 27 facilitates the making of this connection. A sheet member 28 is joined to the inner face of treatment chamber 25 and preferably extends to the upper edge thereof. This sheet member is bent so as to form a passageway 29 with the side of treatment chamber 25. The lower end 84 of sheet member 28 is preferably flared outward and a screen member 30 joined thereto at its upper end and to a suitable anchor member 31 at its lower end. In preferred construction, screen member 30 is formed from vertically mounted rods spaced apart so as to provide open slits therebetween which, in preferred construction, range from 1/8" to 1/2" in size. The upper edge of treatment chamber 25 is cut away in the area covered by sheet member 28 so as to form an over flow wier 32.

Mounted within housing 1 adjacent its top and above the level of the upper end of treating chamber 25 is a housing member 33 preferably having a cover 85 and which contains the ozone generating and pumping apparatus which will be hereinafter described. This housing member containing the ozone apparatus may be mounted outside of the housing 1, if desired, as is typically shown in Figure 7. Depending from housing member 33 is a tube 34 which passes into treatment chamber 25 and extends to a point near but substantially spaced from the bottom thereof. This tube 34 acts as the delivery tube through which ozone is pumped, and is preferably formed from brass, although obviously other materials may be used in equivalent manner.

For flushing the bowl 6 and tray 7, a ring tube 35 (Figure 1) suitably perforated at short intervals, is mounted in the pocket formed between downturned flange 5 and bowl member 6. Tube 35 is connected by means of pipe 36 to spout 37 and a water supply member 38. Where water under pressure is available, the water supply member 38 may be in the form of a faucet. On the other hand, where the water supply is not under pressure, the water supply member 38 may take the form of a water pump connected to a suitable source of supply and adapted to be operated in conventional manner. The illustration of water supply member 38 is intended to diagrammatically show either of these constructions. To facilitate the mounting of member 38 and its depending connections at the back corner of upper panel 2, the corresponding corner of housing 1 may be indented as shown in Figure 2. For convenience of use, upper closure panel 2 is provided with a toilet seat 39 and cover 40 pivotally mounted on a conventional supporting member 41.

The housing member 33 (Figure 9) contains an electric motor 42 connected to a rotary pump 43 which may be of any of the conventional types such as gear driven, centrifugal, rotary sliding vane, or the like. Tube 34 acts as the outlet from the pump, and tube 44 acts as the inlet to the pump and connects same to the housing 45 which contains the ozone generator 46. A compartment 47 between the end of ozone generator 46 and the closed end 48 of housing 45 aids in operably connecting the system for flow therethrough of air containing ozone. The opposite end 49 of housing 45 is left open as an inlet for air passing through the ozone generator. Various types of ozone generators may be used, and one which we have found very convenient involves the use of a typical condenser construction utilizing metal screens 50 and 51 (Figure 11) suitably separated by insulating spacers 52 and 53 which may be of any suitable material such as sheet mica. The assembly of these metal screens and insulating spacers is preferably rolled up in the direction of the arrow (Figure 11) and then placed in housing 45 with connecting wires 54 and 55 passing out of the open end 49 thereof. Housing 45 may be installed so as to facilitate insertion and removal of the ozone generator assembly or such assembly may be installed in housing 45 before the latter is fastened in place in housing 33. These wires 54 and 55 in turn are connected to the high potential side of a high voltage low amperage transformer 56. The primary winding of this transformer is connected in parallel with the electric motor 42 through switch 57 to any suitable source of alternating current such as 110 or 220 volt, 25 to 60 cycle. While the switch 57 may be of various types, such as a conventional snap switch, we prefer to use a timing switch such as is used on toasters for timing the toasting cycle and then ejecting the toast. Such a switch has an operating lever 58 which may project through the end of housing member 33 and be movable in slot 59 thereof. Any convenient mode of operating switch 57 through lever 58 may be utilized, and one which we have found highly satisfactory in connection with the house trailer toilet shown in Figure 1 involves the use of a lever 16 (Figure 6) which has a projecting end 60 adapted to move downward when handle 21 is pulled upward for emptying tray 7. The downward movement of projecting end 60 of lever 16 brings its under face into contact with the upper face of lever 58 (Figures 1, 2, and 8) and depresses lever 58 which upon release in depressed position closes the circuit to electric motor 42 and transformer 56, thus starting the ozone generation and pumping action. The clockwork in the standard construction time switch (details not shown) gradually returns operating lever 58 to its starting position where the electric circuit to the transformer 56 and electric motor 42 is broken, the extent of depression of lever 58 governing the length of time that the electric circuit is closed. For house trailer toilet use as described herein, we have found that two and one-half minutes' operation of the ozone generator and pump each time the toilet is used suffices for most purposes, although there is no specific limitation to this exact time since the size of the ozone generator and pump, as well as the ozone output and other factors, will vary the required operating time.

For the house trailer toilet, the transformer output is preferably approximately 3,000 volts at 5 to 8 milliamperes. This voltage and load causes a very satisfactory corona to form in the condenser type ozone generator with satisfactory production of ozone. There is no particular limitation, however, to this specific voltage and amperage, since either may be varied over a considerable range with satisfactory results. A corona, for instance, can be obtained at even a thousand volts. The size and number of the metal screen plates 50 and 51 will also vary the milliampere load, as well as the amount of ozone produced. The size and number of such plates, accordingly, will be increased where more ozone is needed. In house trailer toilets, it is preferable to slowly bubble air containing ozone in more concentrated form through the sewage being treated so as to reduce the amount of gases circulated, and produce a more quiescent sewage treatment. This may be accomplished, for instance, by making the ozone generating unit 46 of rather compact construction so as to reduce the rate of flow of air therethrough under influence of the pump. Sewage systems on the other hand adapted for handling larger quantities of sewage may be advantageously constructed for pumping larger quantities of ozone into the sewage to be treated. This may be taken care of by allowing relatively free flow of air through the ozone generator and at the same time by making the ozone generator of a larger size.

A modified house trailer toilet construction is shown in Figure 8 wherein the whole housing 1a of the toilet acts as a treatment chamber and the fluid overflow therefrom passes through connecting pipe 65 to a storage tank 61 below housing 1a. Storage tank 61 in this construction is preferably set below a false floor 86 and housing 1a mounted thereon so as to form a composite unit which may be mounted on the trailer floor 62 at a suitable location. The bottom 64 of tank 61 preferably slopes downward to outlet connection valve 63 to facilitate flushing the tank. Construction in this manner permits the use of a deeper bowl, a smaller toilet housing assembly which is very advantageous where available toilet room space is limited, and keeps the whole assembly within the trailer compartment where freezing danger is minimized.

On farms or in villages or sections of cities not having sewer facilities, it is common practice to deliver sewage to a cesspool system normally consisting of a series of tanks, the last of which is perforated or provided with an open bottom. The proper functioning of such cesspool system requires that the sewage be liquified sufficiently by the time it passes to the end of the system so that it will be leached away into the ground at the outlet end thereof. In accordance with the present invention the sewage under such conditions is delivered through a suitable conduit 66 into an enlarged buried housing 1b (Figure 7). The outlet conduit 67, which connects the interior of housing 1b to the rest of the cesspool system, is preferably provided with a sheet member 28 having a screen member 30 at the bottom thereof to insure that sewage from the treated and fluidified level hereinafter described is withdrawn in step with the addition of fresh sewage to the body within housing 1b.

A housing member 33a containing the ozone generating and pumping assembly may be mounted on the top of housing 1b or at any other suitable point appropriate to the forcing of ozone through pipe 34 into the body of sewage.

Various types of operating switches may be used to control the time and period of operation of the ozone generating and pumping device. For instance, a check valve type of apparatus 68 (Figure 7) may have a suitable electric switch incorporated therewith and connected for operating the ozone generating and pumping system. Housing 1b is preferably provided with a vent pipe 69 to permit breathing action in response to variations in inflow and outflow of sewage through housing 1b. A small inlet connection pipe 70 is used to join the interior of housing member 33a containing the ozone generating and pumping apparatus with the interior of housing 1b for circulation purposes, and this connection is preferably made with vent pipe 69 to minimize plugging due to splashing of sewage upon delivery to housing 1b.

Instead of using a rotary type pump as shown in Figure 9, the apparatus may be equipped with a reciprocating piston pump 71 (Figure 3). Under these conditions, the electric motor 42a may have a cam 72 fastened on shaft 73 so that as the motor operates, the cam 72 will, during part of its rotation, depress push rod 74 which carries piston 75 on its lower end, and then release same. A spring 76 may be used to return the push rod and piston in an upward direction in step with the motion permitted due to rotation of cam 72. The piston used in this pump, for simplicity, should be of the single acting type which pumps on the down stroke and permits the ozone-laden air coming into the pump from the ozone generator to by-pass the piston on the up stroke. A check valve 77 in delivery tube 34 may be used to facilitate efficient pumping action. However, where tube 34 is relatively small and pump 71 operated at a high rate of speed, the inertia of the flowing pump air is sufficient to reduce the return flow under pumping conditions to a point where check valve 77 may be satisfactorily omitted.

The operation of the apparatus shown in Figure 1 is as follows: Two or three quarts of water are first placed in treatment chamber 25, following which the apparatus is ready for use. Continued use of the toilet and the flushing of same with a relatively small quantity of water, preferably a pint or less for each flushing treatment, will gradually fill treatment chamber 25 to the elevation of wier 32, and at the same time the upward pulling of handle 21 each time the toilet is used will actuate switch 57 and cause the ozone generating and pumping assembly to produce and force ozone through pipe 34 into the body of sewage in treatment chamber 25. This ozone in bubbling through the sewage acts to deodorize same and chemically break it down to a relatively free-flowing condition. In doing this, the sewage will gradually take on a stratified condition wherein the lower stratum 78 will consist of sediment and solids at least part of which are in the course of being broken down to a more fluid condition under the influence of ozone. The intermediate stratum 79 will have become relatively free flowing under the ozone treatment, while the upper stratum 80 will consist largely of fresh or partially treated sewage containing the lighter gravity elements thereof. By extending sheet member 28 down to a point well above the top of bottom stratum 78 and yet far below the upper edge of intermediate stratum 79, additions of fresh sewage to that in treatment chamber 25 will merely cause part of the free-flowing treated intermediate stratum 79 to flow through screen member 30 up passageway 29 and over overflow wier 32 into the sewage storage compartment space of housing 1 surrounding treatment chamber 25. At intervals, preferably not exceeding that which permits the storage compartment to fill to a point between wier 32 and the top of treatment chamber 25, the stored sewage should be drawn off through valve 63 and disposed of in conventional manner. The use of screen member 30 in treatment chamber 25 presents the advantage of preventing any non-disintegrated paper or the like from passing into passageway 29 and plugging same. By making screen member 30 large relative to passageway 29, the rate of flow through the screen per unit area thereof will be reduced, thus again aiding in its efficient operation.

The ozone generated and bubbled through the sewage normally will not all be absorbed before it reaches the surface of the sewage in the treatment chamber. Ozone, however, is heavier than air and will rest in a layer on the top of the sewage in the treatment chamber to continue treatment thereof by surface contact and also to deodorize any fumes arising from the sewage. Continued operation of the apparatus, coupled with diffusion of the ozone through the air inside of the toilet, will cause same to also fill the interior of housing 1 outside of treatment chamber 25 where it will again be available to further treat the overflowed treated sewage and deodorize any fumes which may arise therefrom. Part of the ozone, upon operation of the toilet, will also be carried into the room in which the toilet is placed, and this ozone in turn will act to deodorize the air therein, thus providing for still more sanitary and satisfactory use of a toilet in the confined space of a house trailer.

Where a small capacity relatively cheap toilet is all that is required, these conditions may be satisfied and the characteristic toilet odors and deodorant chemicals eliminated by utilizing our simplified toilet construction as shown in Figure 12. In this construction, the housing 1c is provided with an upper closure panel 2c which is connected thereto by means of hinge 87. This construction permits ready access to the interior of housing 1c. In the place of a fixed location treatment chamber 25, as shown in Figure 1, a pail type receptacle 88 with bail 89 is used. The ozone generating and pumping assembly is mounted in housing member 33 for operation in the manner herein described. The ozone delivery tube 34a in this case is made flexible so that it may be removed from pail 88 when the latter is to be emptied and may again be placed therein after the pail has been returned to initial position. In order to keep pail 88 located in proper position under bowl member 6, a guide member 90 mounted at the bottom of housing 1c may be utilized. This type of construction facilitates the chemical treatment of the sewage with ozone to satisfy its biochemical oxygen demand and deodorize same. At the same time, the excess ozone generated will form an ozone-laden air layer over the sewage in pail 88 and will also permeate the rest of the clear space inside of housing 1c so as to keep same deodorized. The operation of the toilet will cause part of this ozone-laden air to escape into the toilet room where it will be available for the deodorization of same. All of these factors are of a definite aid in making possible the satisfactory use of a toilet under conditions such as are present in house trailers and the like.

Other modes of applying the principle of our invention may be employed instead of those explained, change being made as regards the means and the methods herein disclosed, provided those stated by any of the following claims or their equivalent be employed.

We therefore particularly point out and distinctly claim as our invention:

1. A method of treating aqueous sewage having a high colloidal matter content, which includes the steps of releasing ozone in said body of sewage to chemically treat, sterilize, and deodorize same, and further treating said sewage by contacting the upper surface of same with an ozone-laden layer of air.

2. A method of treating aqueous sewage having a high colloidal matter content, which comprises the steps of releasing ozone in said body of sewage to chemically treat, sterilize, and deodorize same, transferring a portion of said ozone treated sewage from the point of treating to a point adapted for limited additive storage in step with the addition of fresh sewage to the body of some at the point of treatment, and further treating said sewage both at the point of initial treatment and the point of storage of said sewage by contacting the upper surface of same with an ozone-laden layer of air.

3. A method of treating sewage having colloidal matter therein, including the steps of introducing ozone directly into a body of the sewage, and removing an ozone treated portion of said sewage from said body in step with the addition of fresh sewage to said body.

4. The method of treating sewage containing a high percentage of colloids and colloidal matter, which comprises bubbling air laden with fresh ozone through a body of sewage to convert a portion of same to relatively free-flowing condition, withdrawing a portion of said relatively free-flowing treated sewage substantially in step with the adding of fresh sewage to said body thereof being treated, and further treating the withdrawn sewage, as well as that through which ozone has been bubbled, by contacting the upper surface of same with ozone-laden air.

5. A device of the character described for treating a body of sewage, which comprises in combination a housing, a sewage treatment receptacle for holding said body of sewage within said housing, an ozone generator, means for pumping the ozone produced in said ozone generator, and means for conducting the pumped ozone into the sewage treatment receptacle for release and passage through said sewage.

6. A device of the character described for treating a body of sewage, which comprises in combination an ozone generator, a sewage treatment compartment, means for pumping the ozone produced in said ozone generator, means for conducting the pumped ozone into the sewage treatment compartment for passage through said body of sewage, means connecting said sewage treatment compartment above said body of sewage to said ozone generator for recirculation of gases through said ozone generator, and means for withdrawing a portion of said body of treated sewage from said treatment compartment in step with the addition of fresh sewage to that remaining in the sewage treatment compartment.

7. A sewage receiving and treating device of the character described which comprises a sewage treating receptacle, a storage compartment for sewage treated in said receptacle, an ozone generator, means for pumping and delivering the ozone from said ozone generator into said treatment receptacle for passage through the sewage being treated, and means for transmitting treated sewage from said treatment receptacle to said storage compartment substantially in step with the addition of fresh sewage to the body of sewage in said treatment receptacle, said last-named means comprising a member forming a passageway having an outlet from said treatment receptacle substantially adjacent its upper end, and an inlet within said receptacle intermediate of said outlet and the bottom of said receptacle but substantially spaced from both.

8. In a device of the character described, a liquid tight housing having an open top, a closure member for the open top of said housing, means for making an air tight sealed joint between said closure member and said housing, an open ended bowl member depending from said closure member into said housing, said bowl member being sealed to said closure member, and said closure member opening into said bowl member, an upturned edge tray below said bowl member and receiving the lower end of said bowl member so as to form a seal therewith when said tray is filled with water, a pivoted supporting means for said tray, means for swinging said supporting means and tray from under the open lower end of said bowl member and then returning same to initial position, and a treatment chamber within said housing at a point below said bowl member and in position to receive any material discharged from said tray when same is swung for emptying purposes.

9. In a device of the character described, a liquid tight housing having an open top, a closure member for the open top of said housing, means for making an air tight sealed joint between said closure member and said housing, an open ended bowl member depending from said closure member into said housing, said bowl member being sealed to said closure member, and said closure member opening into said bowl member, an upturned edge tray below said bowl member and receiving the lower end of said bowl member so as to form a seal therewith when said tray is filled with water, a pivoted supporting means for said tray, and means for swinging said supporting means and tray from under the open lower end of said bowl member and then returning same to initial position, said means for swinging said supporting means and tray including a toggle linkage which locks the tray supporting means when the tray is in sealing position under the bowl member so that said tray supporting means will not pivotally move due to downward pressure exerted on said tray from the inside of said bowl.

10. In a device of the character described, a liquid tight housing having an open top, a closure member for the open top of said housing, means for making an air tight sealed joint between said closure member and said housing, an open ended bowl member depending from said closure member into said housing, said bowl member being sealed to said closure member, and said closure member opening into said bowl member, an upturned edge tray below said bowl member and receiving the lower end of said bowl member so as to form a seal therewith when said tray is filled with water, a pivoted supporting means for said tray, means for swinging said supporting means and tray from under the open lower end of said bowl member and then returning same to initial position, an ozone generation system, a time switch for starting and stopping the operation of said ozone generation system upon swinging said tray, and means for delivering and releasing air laden with ozone produced by said ozone generation system into the interior of said housing.

11. In a device of the character described, a liquid tight housing having an open top, a closure member for the open top of said housing, means for making an air tight sealed joint between said closure member and said housing, an open ended bowl member depending from said closure member into said housing, said bowl member being sealed to said closure member, and said closure member opening into said bowl member, an upturned edge tray below said bowl member and receiving the lower end of said bowl member so as to form a seal therewith when said tray is filled with water, a pivoted supporting means for said tray, said supporting means being mounted with its pivotal axis horizontally offset in the direction of swinging said tray to empty, whereby clearance of the lower end of the bowl when the tray is swung is facilitated as well as the contents of the tray readily dumped, means for swinging said supporting means and tray from under the open lower end of said bowl member and then returning same to initial position, means within said bowl adjacent the upper closure member for said housing for flushing said bowl with a suitable liquid, means for connecting said bowl flushing means to a suitable source of liquid supply, and means for emptying said housing.

12. In a device of the character described, the combination of an open top housing member of liquid-tight construction, a cover member therefor, a bowl member depending from said cover member into said housing member, said cover member opening into said bowl member which is open at both its upper and lower ends, a closing member for the lower end of said bowl member, means for operating said closing member so as to open and close the lower end of said bowl member, an ozone generating system, means for pumping and delivering air containing ozone generated by said ozone generating system to a predetermined point within said housing, a switch for connecting said ozone generating system to a suitable source of electricity, and means cooperating with said means which operates the closing member at the lower end of said bowl member, for operating said switch.

13. In a toilet, the combination of a liquid-tight housing with open upper end, a cover member therefor carrying a toilet seat, an open ended bowl member depending from said cover member directly below the hole through said toilet seat, said cover member having a corresponding opening below said toilet seat to provide a suitable passageway into said bowl, an upturned edge tray below the lower end of said bowl and receiving the end of same so as to form a seal therewith when said tray is filled with water, a pivoted supporting means for said tray, means for moving said supporting means and tray from under the open lower end of said bowl member and then returning same to initial position, said last-named means including a toggle linkage which locks the tray supporting means in place when the tray is in sealing position under the bowl member so that said tray supporting means will not pivotally move due to pressure exerted on said tray from the inside of said bowl, a sewage treatment receptacle within said housing and directly below said bowl so that material passing through the lower end of said bowl will be deposited in said receptacle, means for flushing said bowl with water, an ozone generating system, means for pumping air laden with ozone produced by said generating system, means for conducting said ozone-laden air from said pumping means to a point within said treatment receptacle well below the top of the normal sewage level in said receptacle but substantially spaced from the bottom thereof, an overflow means for maintaining a relatively constant level of sewage in said treatment compartment, said overflow means being connected so as to withdraw the sewage from the sewage treatment receptacle at a point below the upper level of the sewage in said receptacle and substantially above the bottom thereof, the space in said housing surrounding said treatment receptacle acting as a storage compartment for the treated sewage delivered from said treatment compartment, means for withdrawing said treated sewage from said storage compartment, and a time switch for connecting said ozone generating and pumping apparatus to a suitable source of electricity, said time switch being automatically operated upon movement of said toggle linkage to remove said tray from under the lower end of said bowl member.

14. A device of the character described for treating a body of sewage, which comprises in combination a housing, a sewage treatment receptacle for holding said body of sewage in said housing, a cover member for said housing, said cover member having a closeable opening therethrough for delivery of sewage to said treatment receptacle, an ozone generator, means for pumping air containing the ozone produced in said ozone generator, means for conducting the pumped ozone containing air into the sewage treatment receptacle for release and passage through said sewage, and means for conducting air from the interior of said housing back to the ozone generator for reozonization and pumping through said body of sewage.

15. A device of the character described for treating a body of sewage, which comprises in combination a housing, a sewage treatment receptacle for holding said body of sewage in said housing, a cover member for said housing, said cover member having a closeable opening therethrough for delivery of sewage to said treatment receptacle, an ozone generator mounted on said housing, means for pumping air containing the ozone produced in said ozone generator, means for conducting the pumped ozone containing air into the sewage treatment receptacle for release and passage through said sewage, means for conducting air from the interior of said housing back to the ozone generator for reozonization and pumping through said body of sewage, and a timing switch means for starting and controlling the operation of said ozone generator each time fresh sewage is delivered to said treatment receptacle.

GEORGE T. BROWNELL.
       WALTER J. WOODHAMS.